(12) United States Patent
Nohren, Jr.

(10) Patent No.: US 9,764,965 B1
(45) Date of Patent: Sep. 19, 2017

(54) ENHANCED BIOLOGICAL FILTERS FOR SPORT BOTTLES

(71) Applicant: John E. Nohren, Jr., St. Petersburg, FL (US)

(72) Inventor: John E. Nohren, Jr., St. Petersburg, FL (US)

( * ) Notice: Subject to any disclaimer, the term of this patent is extended or adjusted under 35 U.S.C. 154(b) by 355 days.

(21) Appl. No.: 14/010,751

(22) Filed: Aug. 27, 2013

Related U.S. Application Data

(63) Continuation-in-part of application No. 13/543,990, filed on Jul. 9, 2012.

(51) Int. Cl.
| | |
|---|---|
| *B01D 63/06* | (2006.01) |
| *B01D 63/14* | (2006.01) |
| *C02F 1/00* | (2006.01) |
| *B01D 46/52* | (2006.01) |

(52) U.S. Cl.
CPC ............ *C02F 1/003* (2013.01); *B01D 46/527* (2013.01); *B01D 63/067* (2013.01)

(58) Field of Classification Search
None
See application file for complete search history.

(56) References Cited

U.S. PATENT DOCUMENTS

| | | | |
|---|---|---|---|
| 7,473,362 B1 * | 1/2009 | Nohren, Jr. ............ | B01D 61/18 210/321.64 |
| 9,266,043 B2 * | 2/2016 | Han ...................... | B01D 29/111 |

\* cited by examiner

*Primary Examiner* — Krishnan S Menon

(57) ABSTRACT

A filter assembly consists of four principal components. The principle components include a top housing containing the means to fasten in a leak proof manner to a valved top of a sport bottle; a base housing; an outer independent charged layered membrane filter; and an inner independent charged layered membrane filter. Each charged layered filter is in a cylindrical form with pleats.

5 Claims, 7 Drawing Sheets

Fig 1
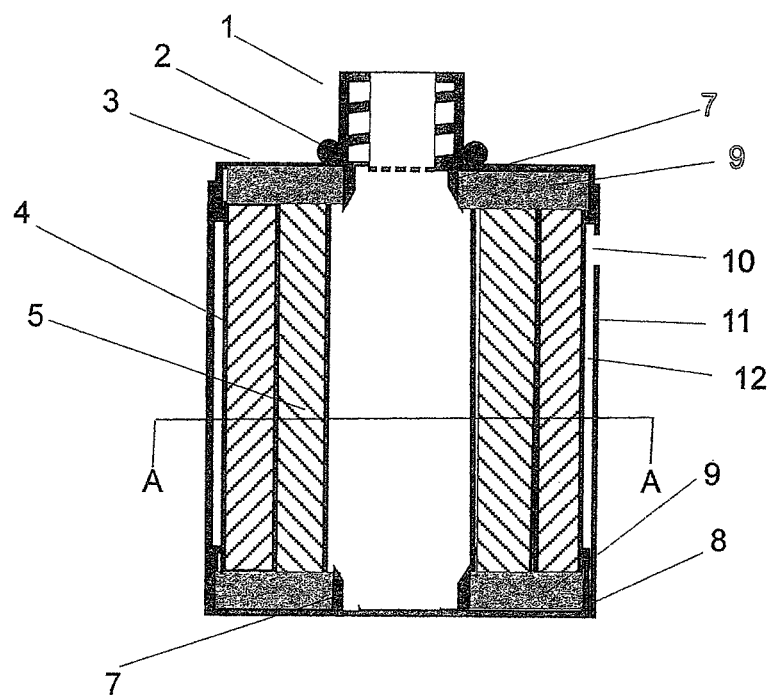
A-A
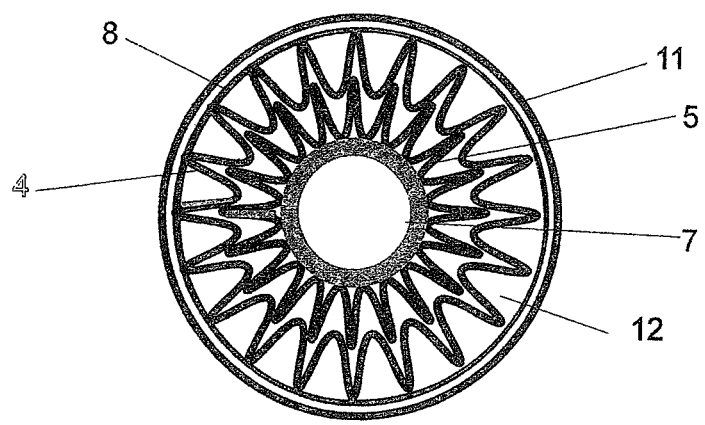

Fig 2
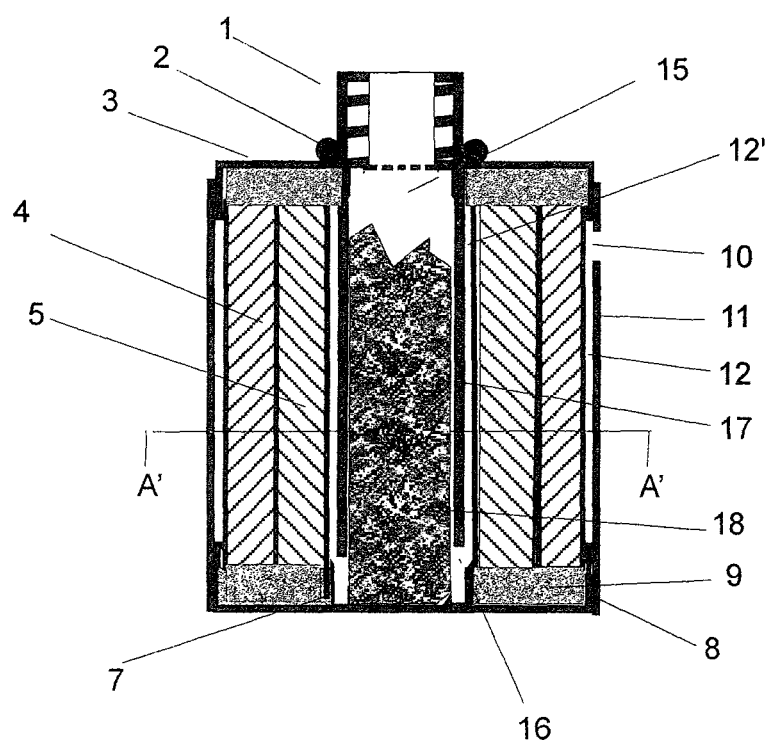
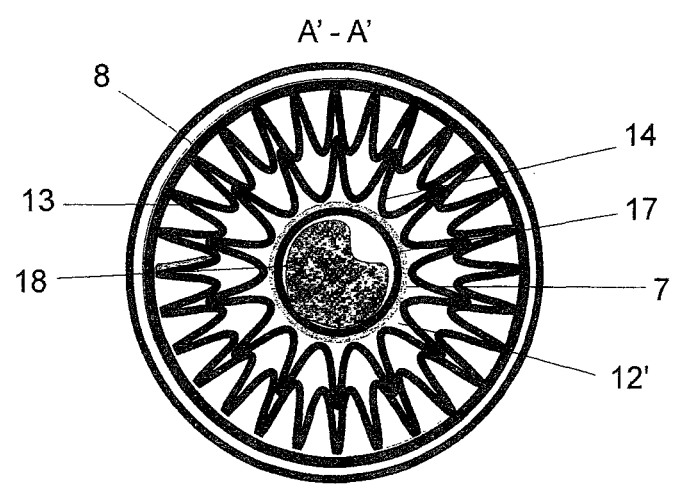

Fig 7
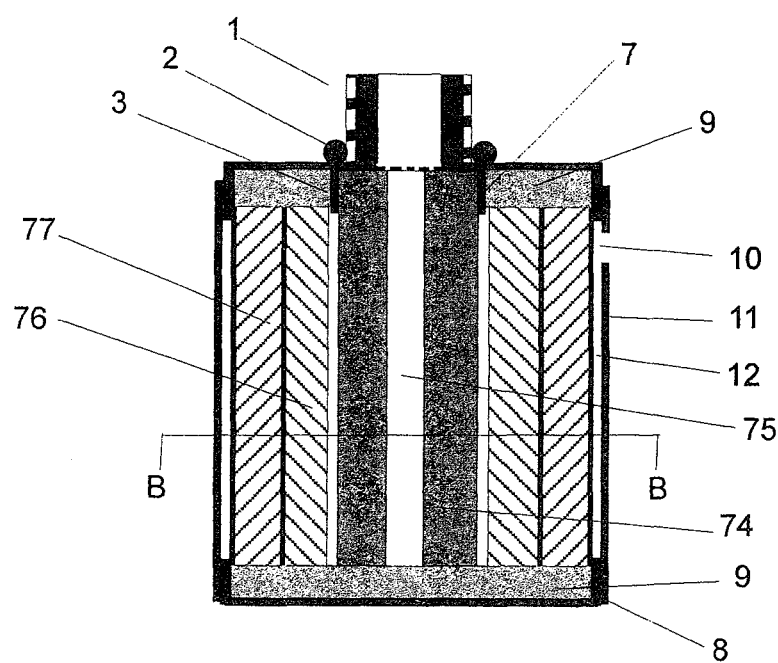
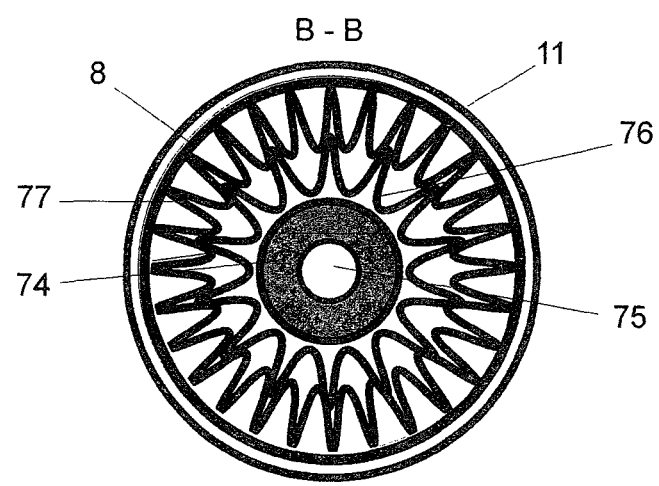

ENHANCED BIOLOGICAL FILTERS FOR SPORT BOTTLES

RELATED APPLICATION

The present patent application is a continuation-in-part of pending U.S. patent application Ser. No. 13/543,990, filed Jul. 9, 2012, the subject matter of which is incorporated herein by reference.

BACKGROUND OF THE INVENTION

Field of the Invention

The present invention relates to enhanced biological filters for sport bottles and more particularly pertains to filtering water with charged layered membrane filters in pleated cylindrical form.

Description of the Prior Art

The use of water filters is known in the prior art. More specifically, water filters previously devised and utilized for the purpose of coupling with sports bottles are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, the prior art does not describe enhanced biological filters for sport bottles that allow filtering water with charged layered membrane filters in pleated cylindrical form.

In this respect, the enhanced biological filters for sport bottles according to the present invention substantially departs from the conventional concepts and designs of the prior art, and in doing so provides an apparatus primarily developed for the purpose of filtering water from a sports bottle through two independent yet integrated charged layered membrane filters in pleated cylindrical form.

Therefore, it can be appreciated that there exists a continuing need for a new and improved enhanced biological filters for sport bottles. In this regard, the present invention substantially fulfills this need.

SUMMARY OF THE INVENTION

For years the need for a portable product capable of significantly reducing biological contamination in surface as well as ground water has been recognized. A number of products have been brought forth to address this need, all of which have had major shortcomings. This included products which used iodine as iodinated resins which had the disadvantage of being toxic to the thyroid as well as eluting the foul taste and odor of iodine. Another shortcoming was the need to establish a dwell or residence time approximating 30 minutes to affect a "kill" with either iodine or chlorine. This frequently presented a problem when the user either did not have the disinfectant available or provided an inadequate time prior to the ingestion of the supposedly treated water thus seriously reducing the effectiveness. Also, chlorine has not always proven effective against protozoan cysts.

A second type of product relied on the application of a hollow fiber membrane to eliminate the transmittal of protozoa cysts and bacteria by size exclusion. The pore size of hollow fiber membranes typically being limited to 2 µm absolute though the claim at times extends to 1 µm absolute. This type product, which may be preceded by a carbon block type filter, had the disadvantage of a significant pressure drop of 5 to more than 10 psi and periodically suffered from air blocks, but more specifically was very quickly fouled by turbidity present in most surface waters. It is also ineffectual against virus because of their small size and is limited to a relatively low rate of flow.

In view of the disadvantages inherent in the known types of water filters now present in the prior art, the present invention provides an improved enhanced biological filters for sport bottles. As such, the general purpose of the present invention, which will be described subsequently in greater detail, is to provide new and improved enhanced biological filters for sport bottles and method which has all the advantages of the prior art and none of the disadvantages. To attain this, the present invention essentially comprises two separate and independent charged layered membrane filters integrated within a single filter housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved enhanced biological filters for sport bottles which have all of the advantages of the prior art water filters and none of the disadvantages.

It is another object of the present invention to provide new and improved enhanced biological filters for sport bottles which may be easily and efficiently manufactured and marketed.

It is further object of the present invention to provide new and improved enhanced biological filters for sport bottles which are of durable and reliable constructions.

An even further object of the present invention is to provide new and improved enhanced biological filters for sport bottles which are susceptible of a low cost of manufacture with regard to both materials and labor, and which accordingly are then susceptible to low prices to the consumer, thereby making such enhanced biological filters for sport bottles economically available to the buying public.

Even still another object of the present invention is to provide enhanced biological filters for sport bottles, the filters including charged layered membrane filters in pleated cylindrical form.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 shows a two stage water filter encased in an outer housing with water entry at the top, providing radial flow over the exposed filter surfaces, the two filters with one positioned inside the other with minimum contact between the two filters, the housing having a threaded top for mounting to the base of a sport bottle top with integral valve.

FIG. 1 A-A is a cross sectional view of FIG. 1 showing the pleated configuration of the 20 pleat outer filter with a corresponding 20 pleat inner filter, both of the same pleat width with slight intrusion into the open area between the outer pleats by the inner pleats.

FIG. 2 illustrates a water filter identical to FIG. 1 with the exception that within the two integrating charged layered membrane filters there is positioned an inner tube, open at the base, for water flow that has been added to permit the addition of a second granulated or fibrous non-woven media, the function of which requires additional contact or residence time while using axial water flow, examples of such media include non-woven static filtration media and granular alkalizing media.

FIG. 1 A'-A' is the same as section A-A except that the outer filter is 28 pleats and the inner filter is 14 pleats with slight inclusion within the open outer pleats by the inner filter, the reduced number of inner pleats allowing for a more open pleat without pleat occlusion.

FIG. 7 shows a dual charged layered membrane filter, the charged layered membrane components with all positively charged elements and no activated carbon powder maximizing the biological capability of the filter and containing a separate carbon composite monolithic open center filter to provide both chemical and metal reduction capabilities.

The same reference numerals refer to the same parts throughout the various Figures.

DESCRIPTION OF THE PREFERRED EMBODIMENT

Figure 3:
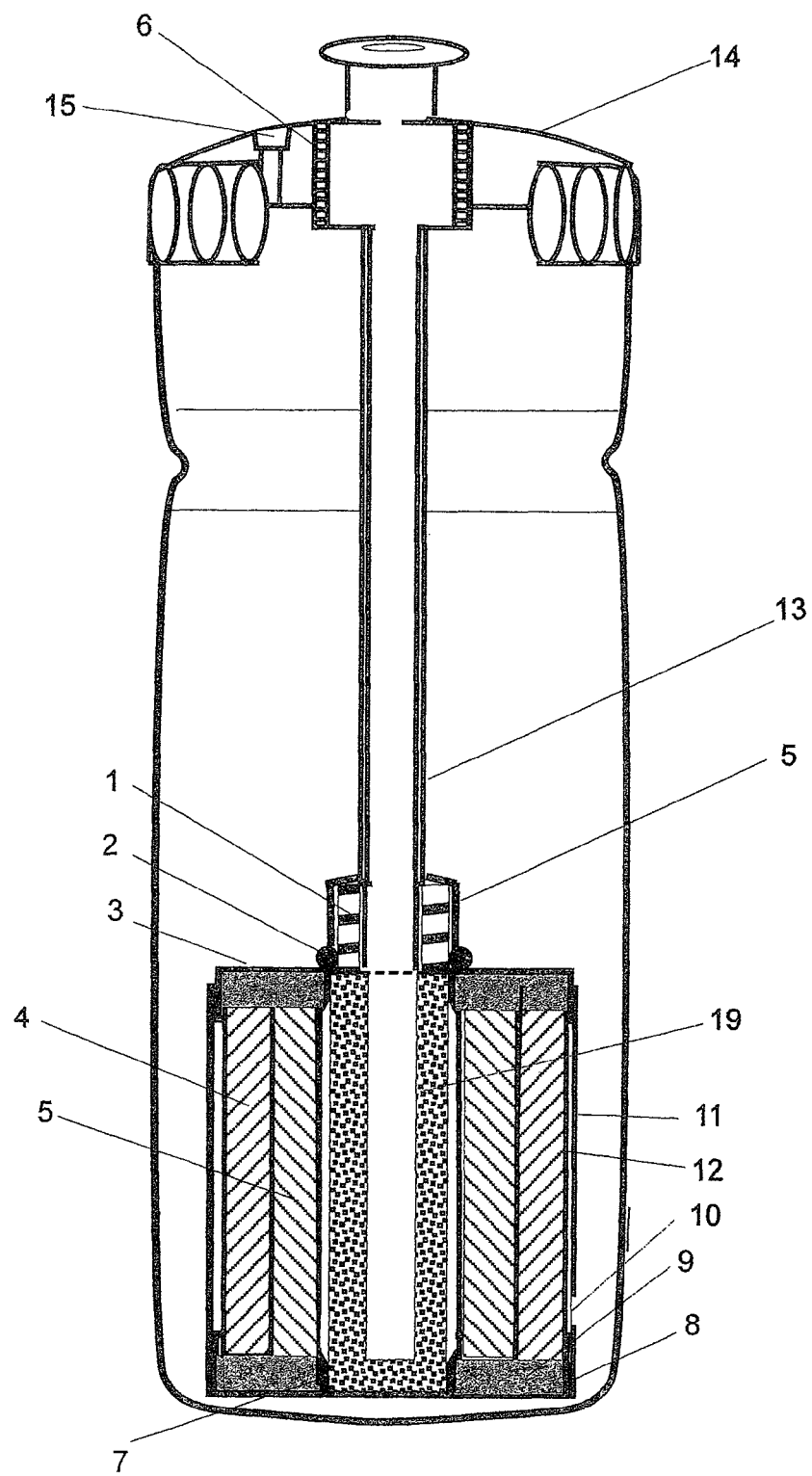
FIG. 3 shows a sport type bottle with valved cap and air relief valve from which a hollow tube connects the top with the filter containing two separate but integrating charged layered membrane filters identical to the filter shown in FIG. 1 or FIG. 2 with the exception that the water entry ports are positioned at the base of the filter rather than at the top, the filter being suspended at the base of the bottle for use in the upright position, the user drinking through the straw.

The following detailed description of the invention will also discuss differences in construction and the advantages gained.

FIG. 1 shows a common dual element filter for mounting to the cap of a Sport type bottle. The filter consists of an outer top housing 3, with threaded top 1, an O-ring seal 2 for assembly to a mating bottle top; side housing 11 which assembles to base housing 8 and top housing 3 and contains a series of peripheral openings 10 for water entry into water feed channel 12. The base housing 8, supports the pleated charger layered membrane filter elements 4 and 5 which are retained in position by potting compounds 9, which is held in place within the top and bottom housings 3 and 8 by gusset's 7. The water entering through entry ports 10 and feed channel 12 passing radially through independent filter layers 4 and 5 entering the hollow central for exit through the hollow top 1.

FIG. 1A-A is a cross sectional view showing the outer housing 11, water feed reservoir 12, outer pleated filter assembly 4, and inner partially intersecting filter pleat assembly 5, together with the potting compound retaining boss 7 and filter base 8.

FIG. 2 is an essentially the same as FIG. 1 with the exceptions that an inner tube 17 is an integral component of top housing 3. A secondary media, as represented by 18, may be used supplementing the charged layered membrane media 4 and 5. The purpose of the solid walled tube 17, with open center 15, is to retain the media 18, which may be an alkalizing media, nitrate specific media, or other water treatment media which requires additional contact or residence time with the water; thus, the tube which provides an axial flow over the entire bed depth. The tube 18 extending down from the top housing 3 is controlled in length to provide a channel 16 above the gusset 7 for the filtered water to enter the central media area 18 for axial flow through the media bed for exit through the opening through the threaded top 1. The water exiting the inner charged layered membrane filter 5 precedes down the flow channel 12' created by the space between the tube 17 and the inner included angle of the charged layered membrane inner filter 5 which is enhanced by the area between the pleats 12', although not as great in area as the pleat openings 12 found with the outer filter 4. Figure A'-A' is identical to preceding Figure A-A except for the charged layered membrane pleat configuration; the outer filter 4 is configured with 28 pleats and the inner filter 5, is configured with 14 pleats which enter the open area of the external pleats 4. By reducing the number of inner pleats, the area within the inner pleat 5 is essentially not occluded greatly reducing back pressure and enhancing flow, thus making more useable filter surface available. The other difference from FIG. 1 is the addition of the inner tube 17, the flow channel 12' and the media installed within the tube 18.

FIG. 3 shows a sport bottle with bottle top 14, with air relief valve 15, the underside of the top 14 containing a mounting boss 6, to which hollow tube 13, is fastened connecting to the filter housing 3 by threaded connection 1. The filter components are identical to the filter described in FIG. 1 with the exception that the side housing has water openings 10 around the periphery of the base enabling the filter and bottle to be used in the up-right attitude. A second difference is the addition of a carbon composite filter 19, open on the water exit end. The carbon filter is of the radial flow type permitting water as it flows through the inner filter 5 to enter the carbon filter as the third element.

Figure 4:
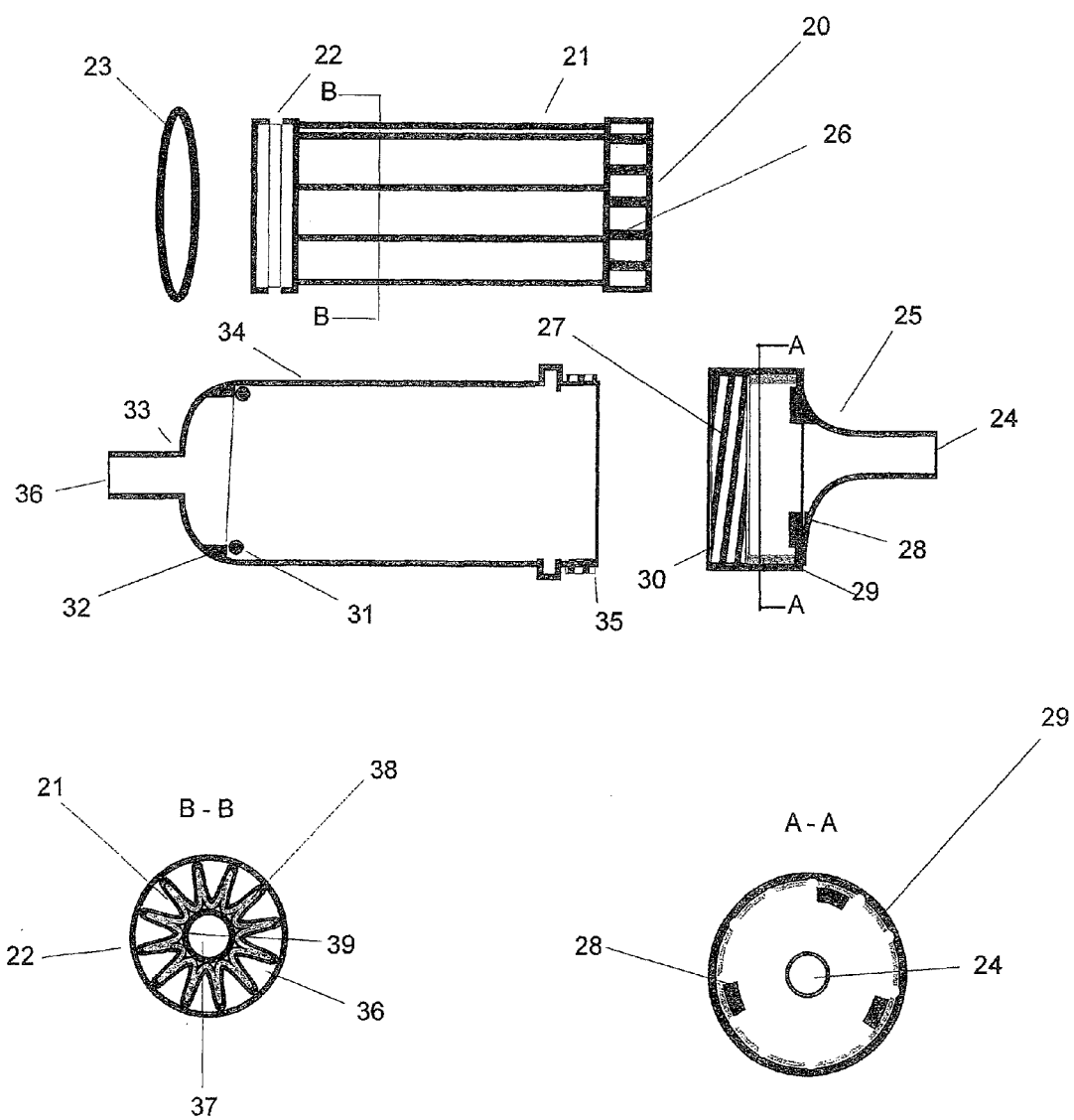
FIG. 4 shows an in-line filter for use with hydration packs as well as for mounting within the water line of a recreational or military vehicle or yacht, view A-A showing the internal mounting and standoff bosses in the in-take end cap, view B-B showing an outer pleated filter configuration with an integral second inner charged layered membrane filter positioned directly onto the outer pleated filter essentially doubling the wall thickness whereby in this instance the outer charged layered membrane filter is without activated carbon, replacing the 30 to 40 percent by weight of activated carbon with an equal mass of Nano alumina-glass fibers, or similar Nano elements to enhance the charge capability and biological effectiveness, the second layered membrane sheet remaining carbon loaded for the reduction of chemical content, whereby this configuration is used to increase the contaminant removal capability when difficult to integrate two separate and independent charged layered membrane filters and, as a result of filter to filter interface, contact there is a larger pressure drop and some efficiency can be lost.

FIG. 4 describes the in-line filter design consisting of the water exit housing 33, the water entry housing 25, and filter assembly 21. The charged layered membrane filters, 38 outer, and 39 inner, as shown in view B-B are held in position by end caps 22 and 20. The filter assembly 21, with O-ring 23 assembled to end cap 22, slides into housing 33 resting against forward stop 32 and $2^{nd}$ O-ring 31. Rear housing 25 is then threaded on housing 33, 35 to 30, the filter 21 bottoming out on interrupted end stops 28, with end cap 20, positioned by interrupted ring 29, with water access slots 26 in end cap 20 allowing water to flow freely to the first filter 38 coming in through opening 24, hence through outer filter 38, inner filter 39, and into center 37, prior to flowing out through exit port 36.

Figure 5:
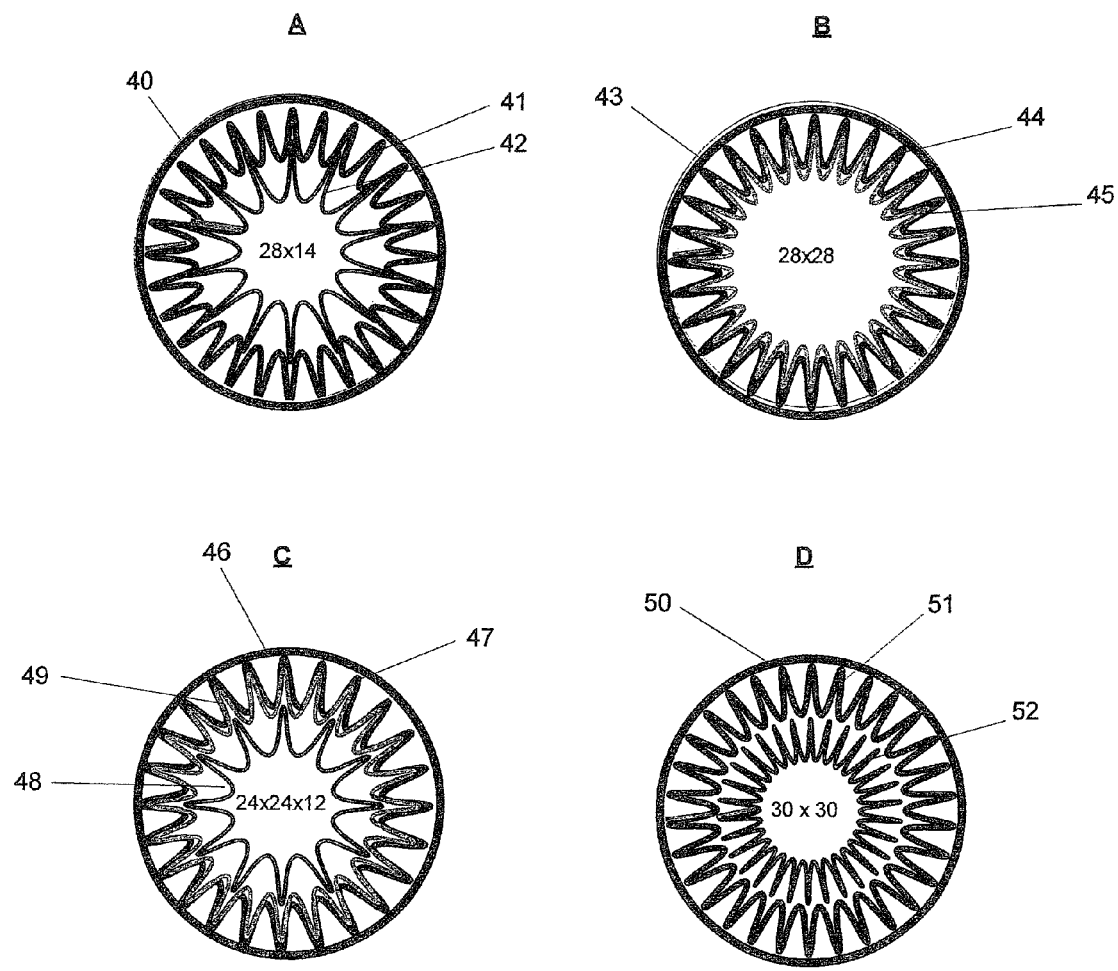
FIG. 5 shows a variation in uncommon but possible pleat configurations as represented by configurations A, B, C and D with both intersecting and non-intersecting pleats as well as an interlocked set of pleats, in one instance.

FIG. 5 shows various relationships between an inner and outer charged layered membrane filter cross sections in a ~42 to ~+52 mm base 40, with varying numbers of pleats and pleat widths. Cross section A is made up of 28, 7 mm wide outer pleats 41, and 14 inner 9 mm pleats 42. There is a partial overlap of the inner filter 42 into the outer filters 41 open pleat area. By reducing the number of pleats by 50 percent provides a match between the open inner pleats of the outer filter 41 and the outer apex angle 42 of the inner filter while eliminating occlusion within the pleats of the inner filter 42. Cross section B nested within 52 mm base 40, represents a nested inner and outer filter 44, and 45, essentially in intimate contact with 28 pleat 7 mm width configurations. The disadvantage of this contact integration is the increase in pressure drop and potential occlusion. Cross section C depicts a three charged layered membrane filter arrangement in a 52 mm base where the external 24 pleat charged layered membrane filter 47 has a 24 pleat second filter 49 positioned with potential intimate contact, and a third 12 pleat filter 48 which may intersect the second filter 49. A configuration of this nature may be used to add additional media for filter longevity. Cross section D represents a 52 mm base housing 40 into which is mounted an outer 30 pleat 8 mm wide filter, 51; and a 30 pleat 7 mm wide internal charged layered membrane filter 52 which does not intersect with the external filter. This causes excessive occlusion reducing effectiveness, and is shown for reference.

Figure 6:
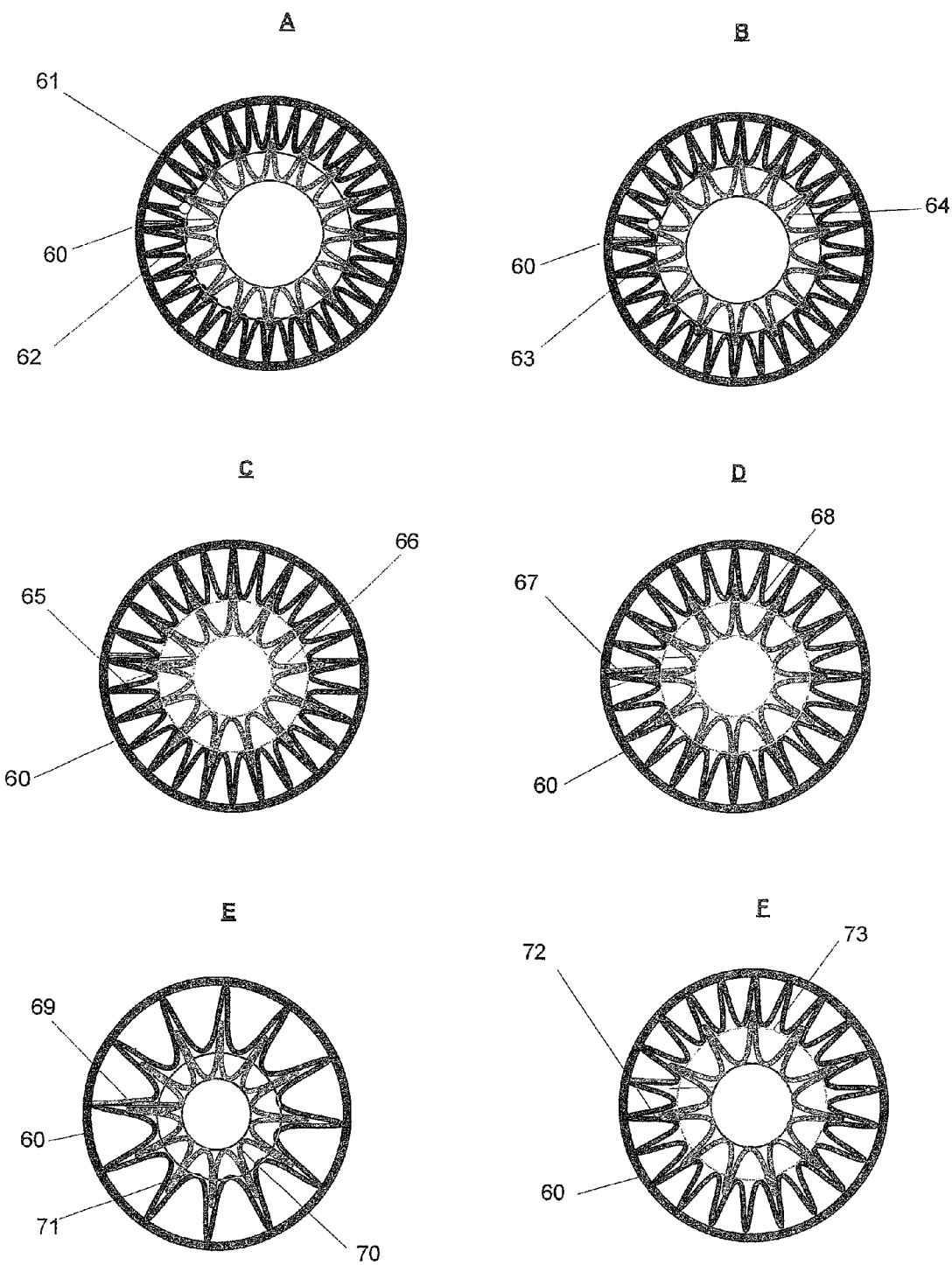
FIG. 6 shows the variation in more common and applied pleat configuration A, B, C, D, and F generally with the inner filter with 50 percent of the number of pleats contained in the internal layer, the fewer number of pleats dictated by the inner filter functioning primarily as a polishing filter to scavenge the few contaminants that may pass through the outer filter. Configuration E shows even with reduced pleat numbers for a given diameter by increasing the depth of the pleats excessively causes occlusion.

FIG. 6 shows a series of six dual filter cross sections positioned within a 52 mm filter base 60, all with inner charged layered membrane filters 61 intersecting with the external charged layered membrane filters 62. With the exception of Cross Section E, all inner filters shown in FIG. 6 contain half the number of pleats as the external filter to permit integration at the intersection of both filters eliminating or significantly reducing the occlusion particularly to the inner filter, the occlusion within the outer filter typical eliminated by the larger outer apex angle permitted with the reduction of the number of pleats and retaining an outer apex internal angle of 19°, or more. Cross Section A shows a 52 mm base 60, within which an outer 32 pleat 7 mm wide charger layered membrane filter 62, and 16 pleat 7 mm wide inner charger layered membrane filter 61 are positioned. This configuration provides good surface area within the plane, controlled by the length, on average between 50 and 76 mm with minimal occlusion. Cross Section B represents a slightly more open configuration within the 52 mm housing 60. The outer external 7 mm wide 28 pleat charged layered membrane filter 63 is intersected by the internal 14 pleat 7 mm wide charged layered membrane filter 64; exhibiting open pleat interiors with internal central space for expansion. Cross section C utilizes such space to increase the width of the inner and outer pleats. The 52 mm body 60, contains a 26 pleat 9 mm outer charger layered membrane pleat with an intersecting 13 pleat 9 mm wide internal pleat 66. Cross section E while showing a dual filter intersecting arrangement 69 and 70 with in a 52 mm housing 60 the external and internal filters are both 12 pleat configurations with the external filter 69 12 mm in width and the internal filter 70, 10 mm in width. It is readily seen that even with the reduced number of pleats, as the pleat width is extended the apex angle is reduced as can be observed with the internal filter 70, significant pleat occlusion takes place.

FIG. 7 is similar to FIGS. 1 and 2 in external configuration. The threaded top 1 threads to the bottle, 2 is the O-ring seal, 3 is the top housing with annulus 9 serving to retain the potting compound 9 which secures the inner and outer independent pleated cylinders 76 and 77 to the top housing as well as to the base housing 8. An open center radial flow carbon composite filter 74 is also potted to the base and may be sealed by light glue applied to the top rim of the filter where it inserts within the gusset 7 which together with the top 3 forms a trough to retain the potting compound 9. The outer wall 11 has openings 10 radially positioned about the periphery near the top of the charger layered membrane filters for water access. Water feed channel 12 distributes the water over the entire surface of the external filter 77. The water passes through charged layered membrane filters 77 and 76 and then passes radially through carbon filter 78 into the hollow center for exit through the neck 1. charged layered membrane filters 76 and 77 have maximized levels of positively charged elements, and thus devoid of activated carbon necessitating the addition of the separate carbon filter for chemical and metals reduction; the charged layered membrane filters maximized for the reduction of biological contaminants.

FIG. 7 B-B Represents a cross section showing the relative position of the outer housing 11, the base housing 8, and 7 mm wide pleats in maximized positive charge element loaded charged layered membrane outer filter 77 and inner filter 76 together with Carbon Composite radial flow filter 74 with open center 78.

The current media of choice that offers advantages over the older media we term charged layered membrane (CLM) media consisting of micro glass fibers to which Nano tubes and/or fibers of a naturally positively charged element is bonded and immersed throughout a cellulosic matrix which may also contain a thermoplastic particulate formed into sheets of 0.8-2 mm thick, with 70 percent-90 percent pore volume and the individual pores controlled to fall equal to or less than 3 microns and subject to a pore spanning positive charge of about 25 mV; the formed sheets further supported by fine polyester scrim. Alternatively, a nanofibrous media retaining the charged elements without the use of a binder continuously dispersed within the nanofibrous structure having a maximum 3 micron ultimate pore size and stability without a scrim covering can be employed with or without the addition of powdered activated carbon.

Previous experimentation with single pleated sheets of charged layered membrane media (CLM) while providing a low pressure drop, and exceptional in its own right for biological treatment is at times borderline, not as totally effective as required for the combined removal of protozoa, bacteria, virus, and chemical content at flow rates at and above 5-10 ml/sec. It would seem obvious that increasing the thickness of the media or using multiple layers of media would improve the removal of microorganisms, but we have found this not necessarily to be the case. Experiments using a double layer of membrane media stacked together yielded roughly the same removal as that with a single sheet. Only when the two layers of media were kept separated did the performance of the double layered filter improve. By replicating the filter, literally a filter within a filter using the same or different pleat configuration of the pleated charged layered membrane media are we able to achieve the desired result for both biological and chemical reduction. One additional note is in order; which is, that the filters are produced using the design constraints covered in the preceding pending above-referenced application.

We have postulated that the performance of the sheets of charged layered membrane media are improved when separated, because the positive charge on the nanofibers is less diffuse when there is reduced interaction with glass fibers. Glass is negatively charged at neutral pH because of the presence of hydroxyl groups on the glass surface, and the positively charged media component, such as aluminum oxide hydroxide, binds to the glass fibers because of this charge difference. When the glass is coated with the charged nanoparticles, electrons within the positively charged material migrate away from the negatively charged glass surface. In the case of a single glass fiber coated with nanoparticles there is a distinct charge gradient in the coating layer, with the side of the layer in contact with the glass most positive. As we consider multiple coated fibers within the charged layered membrane filter media, it becomes apparent that the charge gradient in the coating on a single fiber may be influenced by the interaction of other coated fibers, resulting in a more diffuse gradient. We believe that the coated fibers on the outer surfaces of the sheets of media have a greater affinity for microorganisms than those contained in the middle of the media because of more concentrated charge gradients on the fibers.

Functionally, at a flow rate of 10 ml/sec with a single media layer filter, we achieve consistently a three log reduction of protozoa, a five+log reduction of bacteria, and a 2-3 log reduction of virus depending upon filter surface area. We also remove chemical contaminants in the high 90 percentile range. While these are exceptional results the need persists for a greater reduction of bacteria to six log, or better, as well as a virus reduction of four log, or better. It is also desirable to be able to meet the recommended standards of biological reduction at higher rates of water flow, above 10 ml/sec. We achieve this by using a filter design which incorporates two distinct non-touching media layers arranged in concentric pleated tubes. Thus, by removing equal to or above 99.9 percent with the "first filter" layer, and greater than 99.99 percent of the residual contaminants that pass through the first layer and reach the second filter layer the desired performance levels are achieved; i.e., 3 LRV (Log Removal Value) of Protozoa Cysts; a 6 LRV of Bacteria; and a 4 LRV of Virus, plus a typical reduction in the $98^{th}$ percentile and higher for metals, VOC's, Hydrocarbons, Chlorine, and Taste and Odor.

Table I (See Appendix A) is a general compilation of what we would consider standardized dual layer biological filter configurations. It is noted that in the instances covered in the subject table the inner filter has half the pleats and surface area, in general, as the outer filter. Testing has shown that the inner filter is less challenged and essentially simply "polishing" the effluent from the first filter; thus, requiring less surface area. Secondly, the reduction of pleats opens the apex angles and reduces occlusion, which materially increases filter efficiency.

The more open pleating also permits intersecting pleats; the pleats from the inner filter entering the space between the outer filter pleats thus generating a larger included apex angle than would be possible, given the same number of pleats, if the pleats of the inner filter were retained totally within the center void within the outer filter. While the examples here have concentrated on 7 mm and 9 mm pleats, the pleat width is a variable controlled by the number of pleats, the filter diameter, and apex angle to preclude flow occlusion within the pleat structure.

The desired flow rate for products of this nature would be classed as from 10 to 15 ml/sec. Performance and flow rate are regulated to a large degree by pressure drop and the filter media surface area available as expressed in $Cm^2$. In the designs formulated, test results routinely showed a pressure drop in the 2 psi and under range. Table 2 (See Appendix B) and Table 3 (See Appendix C) show the test result at these rates of flow for a variety of product configurations. It should be noted that while some of the configuration were of an intersecting, nesting nature such as 3C others were not.

In Table 2, the first column, Filter, lists six different filter configurations tested for biological viability. Under each identity heading is a descriptor showing the configuration of the filter. As an example Filter 3C contained fourteen external pleats of 7 mm width; plus an inner filer with 7 pleats of 9 mm width. As shown each tested configuration exceeded the EPA requirements.

Table 3 continues the test conducted under table 2 carrying the results out through thirty gallons at an increased flow of 15 ml/sec. The testing for Parasitic Contaminants was not carried forth as the preceding results left no doubt about the viability of the filters for this contaminant at the extended range and flow.

All testing was conducted by BCS Laboratories in Gainesville, Fla., a registered and certified EPA independent laboratory using NSF/EPA protocol.

As shown by the test results in Table 2 and Table 3 it is obvious that the use of two independent pleated charged layered membrane filtration media layers materially enhances the filter performance. There are several methods by which the two layers may be integrated. The initial and perhaps most obvious is assembling one directly over the other. However, when in direct contact one sheet with the other, and consisting of two or more sheets it was found such an arrangement had a higher pressure drop than could be comfortably used by many individuals in conjunction with a stainless steel sport bottle, and proving more difficult to flow water with a plastic squeeze bottle. Pressure drop across a filter is a combination of changes in static and dynamic pressure as fluid crosses the membrane. The dynamic pressure drop is lower across the second non-touching membrane, because the fluid velocity is reduced by the first filter membrane. The total pressure drop is less because of this reduction in dynamic pressure drop.

More important than the increased pressure drop, the performance suffered not providing any significant advantage over a single charged layered membrane sheet or filter. The intimate contact results in effects which reduce removal performance relative to filter depth. In addition, design flexibility is limited. The one exception to placing two mating pleated sheets in direct contact is when one of the two sheets, preferable the outer, is without carbon containing a proportional increase in Nano alumina, or the charged element, and nested with a carbon containing charger layered membrane media second filter. This is done when space is limited and maximum bio-capability is sought while the carbon element is also desired for the reduction of chemical contaminants chlorine, taste, and odor. Alternatively, an inner monolithic carbon block may be used to add chemical capability to a charged layered membrane media developed solely for biological effectiveness. The more viable option for integrating two, and if deemed necessary, three independent layers simply to extend life, uses the knowledge gained and disclosed in the above-referenced application in which we disclose the discovery of the critical nature of the medias outer apex included pleat angle, which when applied effectively opens the pleat eliminating occlusion and provides the most effective use of available media surface area; and also provides the benefit of opening the void space between pleats into which an inner pleat matrix may extend without interlayer contact to any appreciable degree, less than ten percent, inner to outer pleat surface contact.

This can be visualized in FIG. 7, Configuration A which shows two integrated 22 pleat filters.

The outer filter is a 48 mm diameter pleated cylinder with a 7 mm wide pleat and an about 33 degree included apex angle; the inner intersecting filter with a 21 mm inner diameter, and 7 mm pleat widths extending within the plane of the outer filter approximately 2.25 mm without principal contact; but can retard flow without reducing the effectiveness of the surface area. The included apex angle of the inner filter pleat is about 18.06 degrees. With a functional pleat length of 39 mm there is an effective surface area of 229 $mm^2$.

As previously noted typically greater than 99.99 percent of the biological contaminants and greater than 50 percent-95 percent of the chemical/metal contaminants are removed by the outer pleated filter, the inner independent pleated filter we have found may be reduced in area. By using a 50 percent inner to outer pleat ratio we find we can accomplish the polishing of the water, meaning further reducing to the desired degree the very small percent of contaminants that escaped capture through the first filter. As the remaining contaminants are already reduced by some 90 to greater than 99 percent the inner second filter is not challenged and the absorptive sites are not quickly loaded, becoming less effective.

Thus, it is not necessary to maintain equal pleat numbers, meaning surface area, in the inner and outer filters nor is it necessary that the inner and outer filter pleats are of the same width. As will be noted in Table 2 even with fewer pleats—14 outer pleats and 7 inner pleats the performance was exceptional. It should also be noted that the outer filter has 14, 7 mm wide pleats and the inner filter 7, 9 mm wide pleats.

With the larger included apex angles of the outer filter there is sufficient space to extend the pleats from the inner filter into the void between pleats in the outer filter, permitting a wider inner filter pleat. By increasing the inner pleat width we can also elevate the ratio above 50 percent of the outer pleat surface area, when desired. With this design criteria we may also add still a third filter layer by inserting a third concentric pleated cylinder with 50 percent of the number of pleats as applied to the second filter thus providing the continuing ability to integrate within the void space between pleats. A visual representation is shown in FIG. 5, Configuration C, which shows closely integrated layers A and B with the third layer C pleats penetrating the annulus formed by the two external filters.

The third option, with a dual layer filter, is to have the concentric inner pleated charged layered membrane cylinder reside within the area inside the plane of the outer pleated cylinder, not integrating within the space of the outer inscribed annulus. This configuration may be used when it is determined that a maximum inner and outer filter area is required; typically for filter life. In configuring in such manner the included apex angles are frequently reduced to the point that pleat occlusions take place restricting the flow within the pleats. Incorporating the knowledge conveyed within the pending above-referenced application, it becomes apparent that the most advantageous and effective products with a pleat diameter of 48 mm contain 36 or fewer pleats combined with a separate inner pleated membrane filter containing from the same number to fewer intersecting or non-intersecting pleats. The included apex angle is preferably equal to or above 18 degrees or more. The reduction of pleats increases the area between pleat sides permitting the intersecting of pleats from the inner filter into the void space within functional outer filter pleats. Although the inner filter could be configured with more pleats than the outer filter, by so doing the external apex angles will be more collapsed.

An intersecting inner pleat rests inside the area created by two adjacent inner walls of external pleats. An advantage to the intersecting pleats is the ability to introduce wider inner pleats increasing surface area without adding to the number of pleats. An example of a viable design would be to use a 26 pleat outer filter with 7 mm depth and a 13 pleat second inner filter of 9 mm pleat depth providing 138 $Cm^2$ outer surface area and 88 $Cm^2$ inner surface area within the filter, for a total surface area of 226 $Cm^2$. We have had good results with two pleated filter cylinders arranged in a tandem configuration, both with a 7 mm and 9 mm pleat depth and with widely varying pleat numbers, externally and internally, without intersecting—just separated by an open space.

We have also had significant success with filters of varying pleats between the inner and outer pleated filters as shown in Table 1. Table 4 (See Appendix D) shows alternative filter configurations together with the information significant to each.

From field experience it has become evident that there are different product configurations that suit different purposes. The single layer membrane filter containing powdered activated carbon is excellent for the general treatment of municipal treated water providing the added benefit of a three log reduction of the protozoan *Cryptosporidium* cysts that are chlorine resistant and are found occasionally in municipal delivered water. However, the separated dual layers improve performance, as required, for the removal of biological contamination at higher rates of flow including bacteria and virus to the levels recommended by the EPA and WHO. This also holds true for the chemical and metal contaminants typically targeted. While these tests have used Ahlstrom's Disrupter® as the charged layered membrane media. Disrupter is a trademark of Ahlstrom Corporation of Finland for glass fibers for textile use. Any similar media with the following characteristics would be adaptable. 50 percent-90 percent by volume Nano alumina or charged element bonded to Nano or Micro glass fibers or polymeric micro fiber exerting a columbic charge of 20-60 mV at around pH 7. A stock thickness may be laid up from 0.5 mm to about 2.0 mm. The inert supporting material making up the sheet may be highly porous cellulose; cellulose containing FDA approved thermo plastic particles, or porous plastic as produced by Porex, or similar. Finely ground carbon approximating 0.8 microns is added to about 25 percent-40 percent by weight as an additive. ATS, a zeolite for lead reduction may be added replacing a similar percentage of carbon by volume, as well as Microban®, silver, or similar antimicrobial to prohibit the growth of retained microbiological contaminants. Microban is a trademark of Convenient Systems, Inc., a corporation of North Carolina, for an additive to impart antibacterial, antifungal and antimicrobial properties. This core is then nested between sheets of polyester, nylon, or other suitable highly porous scrim, preferably with a water contact angle of less than 90 degrees. Alternatively, a nanofibrous media retaining the charged elements without a scrim covering can be employed.

The positive charge spanning the pores effectively captures and retains target contaminants by electro adhesion. Negatively charged contaminants include the full range of biological contaminants as well as dipoles such as turbidity and small particulates. Most importantly, for uses herein presented, the very low pressure drop across a single charged layered membrane media surface of about 0.3-less than 2 psi experienced with the charged layered membrane filters permits ease of use in metal, glass or hard plastic bottles that only rely on the negative pressure drop caused by the user sucking on the water delivery tube or valve.

While the application for the elimination of charge specific contaminants is a major advantage, the charged layered membrane media normally employed containing very fine powdered activated carbon, ~8 μm grain size also reduces chemical and metal contaminant content. Some 30-40 percent of the weight of the charged layered membrane sheet consists of this very effective carbon which is held in place by the positive charge rather than a binder thus making the entire surface of the carbon available, without a percentage of sites being blinded by a binder which would otherwise occur.

As a result of the low pressure drop obtained through the use of the charged layered membrane media it is practical to add a second or third independent treatment media. This may be accomplished in three different ways. The most obvious is to add an open base tube extending down from the top housing providing axial flow up through a bed of either granular or compact non-woven media. Another option is to add a center radial flow carbon block filter, and the third option without the tube is to fill the center void area within the internal CML pleated cylindrical filter with compressed treated non-woven media which we term "Static-Filtration" Media. Static Filtration Media can be anyone of a number of substrates; non-woven polyester is a common example. The polyester is coated using a binder retaining activated carbon, zeolites, activated alumina, or other treatment compounds. As used, the non-woven is compressed to reduce the voids within the media to less than 0.5 mm. Thusly compressed the media still possesses 60-80 percent void volume.

In a preferred embodiment the static filtration media comprises a nonwoven mat of a material capable of meeting 21 CFR 177.2260, having a weight of between about 4-7 oz/sq. yd., and a coating comprising about 100-200 percent of the weight of the mat, and including, by weight, or about 60-85 percent activated carbon, about 10-20 percent binder, and about 0-25 percent zeolite. Desirably, the static filtration media has been compressed in one dimension about 25-75 percent (e.g. about 40-60 percent) so as to provide a substantially uniform pore size, and has a ratio readily deliverable liquid volume (as measured by the cessation of streaming flow) to bed volume of about 0.3-0.8, preferably at least 0.4 and a porosity of at least 90 percent. The fibers may be polyester, and substantially fill the inner body or tube. Functionally, the water to be or being treated is always in contact with the media while in the bottle or container. The contaminants within the water adjacent to the media coated fibers are adsorbed by the media. As there are voids within the coated fiber matrix holding the water, as the contaminants are removed from the water in contact with the media coated fibers, the remaining contaminants seeking equilibrium migrate into the area adjacent to the fibers and are in turn removed. Thus, the process of contaminant dispersion caused by the search for equilibrium rapidly removes most all of the contaminants from the contained water. No other process is as effective, nor provides the extended residence time that static filtration does as properly applied. In a portable bottle the movement of the water within the bottle further enhances dispersion and contact with the treatment fibers. As the majority of the contaminant removal normally takes place without water flow, hence the name "Static Filtration".

It is also standard practice to provide sufficient volume inside the pleated charged layered membrane cylinders to contain 20 ml or more filtered water within the non-woven filter media. Ten ml represents a typical mouthful of water; with 20 ml, or more, rapid heavy drinking is supported by the filter. It is also less likely that the user will not meet the drell time required for static filtration. The water retained within the filter housing during the dwell cycle until drunk provides time for "static filtration" to remove contaminants between uses. The filter housing acts as a leak proof cup to retain the water during the dwell period, or inactive cycle, of the filter within which the "Static Filtration" media is immersed.

It has also been learned that the charged layered membrane can be converted into granular media form by cutting sheet stock into pieces smaller or larger than ~0.5 mm×0.5 mm×0.8 mm and using the thusly generated particles as a bulk bed media for the internal section of a central tube providing an axial flow through the particle media bed. The media can also be cut into thread like particles and nested within a tube with axial flow.

To meet the unique requirements of the military two independent charged layered membrane filters containing the maximum desirable loading of positively charged elements are installed in an independent relationship with at least the minimum included angles permitting minimal pleat occlusion. As such charged layered membrane filters are devoid of activated carbon to accommodate the additional charged components, an internal carbon composite hollow center monolithic carbon, or carbon composite filter is used for the reduction of chemical and heavy metals that may also be present. This arrangement permits the highest removal of biological contaminants, an extended filter life, and the highest flow rate to the user.

While Sport type bottles are the obvious beneficiaries of this new charged layered membrane technology; it also benefits the field of in-line portable and travel related products the uses for which include hydration packs for the military together with the ability to install in-line units within the water feed lines of recreational vehicles, yachts and military vehicles.

It is to be understood from the forgoing that the present invention is a portable water filter assembly for use in conjunction with sport bottles of the type having a valved top to which the water filter assembly is adapted to be cooperatively coupled. The water filter assembly consists of four principal components, (1) a top housing containing the means to fasten in a leak proof manner to the valved bottle top; (2) a base housing; (3) an outer independent charged layered membrane filter; and (4) an inner independent charged layered membrane filter. Each charged layered filter is in a cylindrical form with pleats. The charged layered membrane filters having ends sealed to the top housing and to the base housing in a manner precluding water by-pass in a radial flow mode. The charged layered membrane filters are independently arranged to abate surface contact between the charged layered membrane filters positioned one internal to the other with a common central axis. As used herein, the term abate is intended to mean to reduce to a lesser amount or to reduce to zero. The charged layered membrane filters are operational with a pressure of from 1 psi to 5 psi, with increased blockage reducing protozoa cysts equal to or above 99.9 percent, bacteria equal to or above 99.9999 percent, and virus equal to or above 99.99 percent. This is in accordance with the recommendations of the Environmental Protection Agency and the World Health Organization.

The charged layered membrane filters each contain fine powdered activated carbon, being held within each charged layered membrane filter by electrical charge potential without the use of a binder. This provides the capability of reducing chlorine and like chemical contaminants and heavy metals from 50 percent to 99.9 percent.

Further included is a monolithic carbon composite filter as a third filter. This third filter is mounted along the central axis of the charged layered membrane filters to provide extended life for the removal of chemical and heavy metal contaminants.

Further included is a hollow tube formed as a centered inner solid wall. The hollow tube extends from the top housing. The hollow tube has an open bottom above the base. This permits treated water entry from the surrounding charged layered membrane filters. The hollow tube contains a water treatment media for purposes such as increasing the alkalinity and treating for nitrates. The water treatment media optionally adds flavors, vitamins and minerals. The hollow tube, alternately, contains low density non-woven media within the hollow tube which is adapted to function by means of the axial flow of the water through a bed enclosed within the hollow tube.

Further included is an outer housing with water access openings to permit water to fill the void formed by the pleats of the external charged layered membrane filter adjacent to the outer housing. The water when pressurized fills the void area as a water reservoir thereby providing total charged layered membrane water coverage with equalized pressure for radial water flow through the charged layered membrane filters.

Further included is a static filtration media added as a third treatment media filling an otherwise void space within the central area of the inner charged layered membrane filter. The static filtration media preferably is compressed so the nominal void area is less than 0.5 mm in any direction. With the housing water access openings near the top of the charged layered membranes filters, the housing functions as a cup retaining the water drawn in and remaining at the end of a drinking cycle resident within the housing. Such water remains within the filter body during the dwell/static period of the drinking cycle and thus is subject to continued treatment.

Further included is a non-woven low density substrate coated with a treatment media. The low density substrate is positioned within the center tube. The low density substrate is compressed to have void volumes within the matrix of equal to or below 0.50 mm. The available volume is capable of containing equal to or above 15 ml of water. This provides constant treatment during the static portion of the cycle effecting static filtration thereby reducing remaining absorbable contaminants otherwise present to extremely low levels approaching non detectable limits. This also provides an entire bed depth for treatment during the drinking portion of the use cycle.

The pleats are sufficiently open to preclude occlusion within the pleats as a result of the adjacent pleats being compressed together. This arrangement precludes occlusion which would hamper water flow since it would have the effect of reducing effective surface area. The pleats of the inner charged layered matrix filter having an external included angle equal to or above 10 degrees.

The pleats of the external charged layered membrane filter have an external included pleat angle equal to or above 18 degrees. This permits integration into the plane of the external filter by the inner filter thereby allowing for an increased pleat depth and increased functional surface area.

The charged layered membrane filters are positioned at the bottom of the bottle. The water filter assembly further includes a plastic connecting tube coupling the charged layered membrane filters to the valved top for drinking while in a generally up-right vertical position. An outer filter housing extends from the top filter housing to the base with water entry through an opening in the base between the base and vertical side wall. This arrangement distributes the influent water along a vertically exposed surface of the outer charged layered membrane filter. This causes radial entry flow through the outer filter and directly into the inner charged layered membrane filter hence flowing up through the plastic connecting tube to an exit port in the bottle top.

The charged layered membrane filters possess sufficient strength and rigidity to be sufficient without other structural member support.

The two charged layered membrane cylinders are pleated and in direct contact one nested to the other. Alternately, the outer pleated cylinder is composed of a concentration of positively charged Nano particles without carbon and without secondary media while the mating pleated charged layered membrane filters contain from 30 percent to 40 percent by weight finely powdered activated carbon. This provides maximum biological reduction capability with chemical removal, within a diameter too confined to permit separation of filters for optimal performance. The filter assembly is adaptable to small diameter housings.

The sport bottle filter assembly is configured to mount to a valved bottle top and modified to be suspended to the base of a bottle. The filter assembly includes an inner charged layered membrane filter and an outer charged layered membrane filter. Each charged layered membrane filter is devoid of activated carbon to permit maximizing the positively charged element contained within the charged layered membrane for maximum biological capability spanning the pores. The filter assembly also includes a third independent carbon composite radial flow filter inside a central area of the inner charged layered membrane filter for the reduction of chemical and metal contaminants as well as taste and odor. The complete filter meets the performance requirements of the Environmental Protection Agency and the World Health Organization for biological reduction at flow rates of from 10 ml/sec to 15 ml/sec.

The filter as configured is also appropriate for use in an in-line configuration for use with hydration packs under the same use standards as a sport water filter bottle. Further, the same configuration is also adaptable to use in homes, utility vehicles, and yacht among others whereby, in which case pressure of up to 20 psi and increased flow rates in the order of 20 ml/sec are practical with chemical reductions of 50 to 99 percent and biological reductions of from 99.9 percent for protozoa, 99.9999 percent for bacteria, and 99.99 percent for virus, or greater.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Appendix A

TABLE 1

| External Filter 49 mm CD | | | | | Inscribed Inner Filter | | | | | |
|---|---|---|---|---|---|---|---|---|---|---|
| No. pleats | Pleat Width | Base | *½ Base | Apex Angle | Nominal Peat Length 33 mm = Area $Cm^2$ | No. pleats | Pleat Width | Base | *½ Base | Apex Angle | Area $Cm^2$ | Total Area $Cm^2$ |

| No. pleats | Pleat Width | Base | *½ Base | Apex Angle | Peat Length 33 mm = Area $Cm^2$ | No. pleats | Pleat Width | Base | *½ Base | Apex Angle | Area $Cm^2$ | Total Area $Cm^2$ |
|---|---|---|---|---|---|---|---|---|---|---|---|---|
| 36 | 7 mm | 2.080 | 1.040 | 19.72° | 191.10 | 18 | 7 mm | 2.865 | 1.433 | 25.06° | 92.82 | 283.92 |
| 32 | 7 mm | 2.440 | 1.220 | 23.14° | 169.26 | 16 | 7 mm | 3.323 | 1.662 | 29.14° | 81.90 | 251.16 |
| 30 | 7 mm | 2.656 | 1.328 | 25.22° | 158.34 | 15 | 7 mm | 3.598 | 1.799 | 31.72° | 76.44 | 234.78 |
| 28 | 7 mm | 2.903 | 1.451 | 27.60° | 147.42 | 14 | 7 mm | 3.912 | 1.956 | 34.60° | 70.98 | 218.40 |
| 26 | 7 mm | 3.187 | 1.594 | 30.30° | 136.50 | 13 | 7 mm | 4.275 | 2.137 | 37.98° | 65.52 | 202.02 |
| 22 | 7 mm | 3.912 | 1.956 | 33.04° | 114.66 | 22 | 7 mm | 2.199 | 1.099 | 18.06° | 114.66 | 229.32 |
| 26 | 9 mm | 2.644 | 1.322 | 19.18° | 175.50 | 13 | 9 mm | 2.815 | 1.408 | 28.48° | 84.24 | 259.74 |
| 24 | 9 mm | 2.931 | 1.465 | 22.00° | 161.46 | 12 | 9 mm | 3.117 | 1.558 | 31.38° | 77.22 | 238.68 |
| 22 | 9 mm | 3.270 | 1.635 | 24.54° | 147.42 | 11 | 9 mm | 3.473 | 1.736 | 34.86° | 70.20 | 217.62 |
| 20 | 9 mm | 3.677 | 1.838 | 27.60° | 133.38 | 10 | 9 mm | 3.900 | 1.950 | 39.08° | 63.18 | 196.56 |
| 18 | 9 mm | 4.174 | 20.87 | 28.54° | 118.34 | 9 | 9 mm | 4.422 | 2.211 | 44.28° | 56.16 | 175.50 |
| 18 | 9 mm | 4.174 | 20.87 | 28.54° | 119.34 | 18 | 9 mm | 1.811 | 0.906 | 13.78° | 106.08 | 225.42 |
| 16 | 9 mm | 4.796 | 2.398 | 36.16° | 105.30 | 8 | 9 mm | 7.447 | 3.723 | 50.96° | 49.14 | 154.44 |
| 14 | 9 mm | 5.595 | 2.798 | 42.42° | 91.26 | 7 | 9 mm | 8.625 | 4.312 | 59.80° | 42.12 | 133.38 |
| 12 | 9 mm | 6.661 | 3.331 | 50.96° | 77.22 | 6 | 9 mm | 10.196 | 5.098 | 72.34° | 35.10 | 112.32 |

Appendix B

TABLE 2

Six different Biological Filter configurations - all meeting the EPA LRV specifications at 10 ml/sec flow.

Percent Removal of Challenge Species Following Passage of 20 Gallons

| Filter | Three Micron Florescent Beads[1] (Parasitic Contaminants Percent Removal) | *Raoultella terrigena*[2] (Bacterial Contaminants Percent Removal) | MS-2 Bacteriophage[3] (Viral Contaminants Percent Removal) |
|---|---|---|---|
| Filter Influent Water* | $2.5 \times 10^4$ bead/mL | $1.5 \times 10^5$ cfu/ml | $1.5 \times 10^5$ pfu/ml |
| 1A 26(9)/13(9) | >99.998% | >99.9999% | 99.997% |
| 2B 26(9)/26(9) | >99.998% | >99.9999% | >99.9999% |
| 3C 14(7)/7(9) | >99.998% | >99.9999% | >99.9999% |
| 4D 30(7)/30(9) | >99.998% | >99.9999% | >99.9999% |
| 5E 24(7)/14(9) | >99.998% | >99.9999% | >99.9999% |
| 6F 20(7)/10(9) | >99.998% | >99.9999% | 99.9999% |

Appendix C

TABLE 3

Percent Removal of Challenge Species Following Passage of 20 Gallons

| Filter | Three Micron Florescent Beads[1] (Parasitic Contaminants Percent Removal) | *Raoultella terrigena*[2] (Bacterial Contaminants Percent Removal) | MS-2 Bacteriophage[3] (Viral Contaminants Percent Removal) |
|---|---|---|---|
| Filter Influent Water* | N/A | $2.3 \times 10^5$ cfu/ml | $1.9 \times 10^5$ pfu/ml |
| 1A 26(9)/13(9) | N/A | >99.9999% | 99.99% |
| 2B 26(9)/26(9) | N/A | >99.9999% | >99.9999% |

Appendix D

TABLE 4

| Filters Circumference | Pleats | No. Layers | Lengtht†** | Pleat Width | Total Water Penetration Area (mm) | Area $Cm^2$ |
|---|---|---|---|---|---|---|
| 42 mm | 20 × 20 | 2 | | 9 mm | (421 mm @ 35 mm) × 2 | 294.0 |
| 52 mm | 24 × 24 | | 55 mm | 9 × 9 mm | (516 mm @ 35 mm) × 2 | 355.6 |
| | 26 × 26 | 2 | | 9 × 9 mm | (552 mm @ 35 mm) × 2 | 386.4 |
| | 28 × 28 | 2 | | 9 × 9 mm | (596 mm @ 35 mm) × 2 | 417.2 |
| Inline 45 mm | 20 × 20 | 2 | 110 mm | 9 × 9 mm | (421 mm @ 30 mm) × 2 | 588.0 |

What is claimed as being new and desired to be protected by Letters Patent of the United States is as follows:

1. A portable water filter assembly for use in conjunction with sport bottles of the type having a valved top to which the water filter assembly is adapted to be cooperatively coupled; the water filter assembly consisting of a top housing containing the means to fasten in a leak proof manner to the valved top; a base housing; an outer charged layered membrane filter; and an inner charged layered membrane filter; the inner charged layered filter being independent of the outer charged layered filter, each charged layered filter being in a cylindrical form with pleats; the charged layered membrane filters having ends sealed to the top housing and to the base housing in a manner precluding water by-pass in a radial flow mode; the charged layered membrane filters independently arranged to abate surface contact between charged layered membrane filters positioned one internal to the other with a common central axis;

the charged layered membrane filters operational with a pressure of from 1 psi to 5 psi, with increased blockage reducing protozoa cysts equal to or above 99.9 percent, bacteria equal to or above 99.9999 percent, and virus equal to or above 99.99 percent in accordance with the recommendation of the Environmental Protection Agency and the World Health Organization, wherein the two charged layered membrane filters are operative without other structural member support.

2. A water filter assembly as described in claim 1 and further including an outer housing with water access openings to permit water to fill the void formed by the pleats of the external charged layered membrane filter adjacent to the outer housing, the water when pressurized to fill the void area as a water reservoir thereby providing total charged layered membrane water coverage with equalized pressure for radial water flow through the charged layered membrane filters from exterior to interior.

3. A water filter assembly as described in claim 1 wherein the pleats are sufficiently open to preclude occlusion within the pleats as a result of the adjacent pleats being compressed together, to preclude occlusion which hampers water flow and has the effect of reducing effective surface area, the pleats of the inner charged layered matrix filter having an external included angle equal to or above 10 degrees.

4. A water filter assembly as described in claim 1 wherein the pleats of the external charged layered membrane filter have an external included pleat angle equal to or above 18 degrees thereby permitting integration into the plane of the external filter by the inner filter allowing for an increased pleat depth and increased functional surface area.

5. A water filter assembly as described in claim 1 wherein the charged layered membrane filters are positioned at the bottom of the bottle, the water filter assembly further including a plastic connecting tube coupling the charged layered membrane filters to the valved top for drinking while in a generally up-right vertical position.

* * * * *